(12) United States Patent
Tonomura (10) Patent No.: US 11,312,734 B2
(45) Date of Patent: Apr. 26, 2022

(54) NITROGEN-CONTAINING CYCLIC ORGANOXYSILANE COMPOUND AND METHOD FOR PRODUCING THE SAME

(71) Applicant: SHIN-ETSU CHEMICAL CO., LTD., Tokyo (JP)

(72) Inventor: Yoichi Tonomura, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 27 days.

(21) Appl. No.: 16/684,283

(22) Filed: Nov. 14, 2019

(65) Prior Publication Data

US 2020/0165276 A1 May 28, 2020

(30) Foreign Application Priority Data

Nov. 27, 2018 (JP) .............................. JP2018-221342

(51) Int. Cl.
*C07F 7/18* (2006.01)

(52) U.S. Cl.
CPC .......... *C07F 7/1804* (2013.01); *C07F 7/1892* (2013.01)

(58) Field of Classification Search
CPC .................................................... C07F 7/1804
See application file for complete search history.

(56) References Cited

U.S. PATENT DOCUMENTS 8,049,027 B2 11/2011 Honma et al.

FOREIGN PATENT DOCUMENTS

| JP | 8-166679 A | 6/1996 |
| JP | 2010-120925 A | 6/2010 |
| JP | 2014-1152 A | 1/2014 |

OTHER PUBLICATIONS

D'Yakov (Zhurnal Obshchei Khimii, 58(3), 539-47;1988) Abstract provided.*

* cited by examiner

*Primary Examiner* — Valerie Rodriguez-Garcia (74) *Attorney, Agent, or Firm* — Birch, Stewart, Kolasch & Birch, LLP (57) ABSTRACT

A nitrogen-containing cyclic organoxysilane compound having a formula (1):

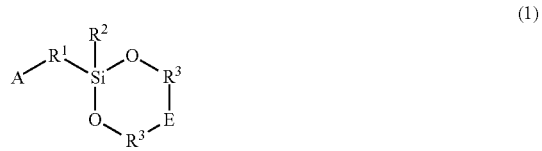

(1)

wherein $R^1$ is a divalent hydrocarbon group, $R^2$ is a monovalent hydrocarbon group or an organoxy group having a formula (2):

$$—OR^4 \quad (2)$$

wherein $R^4$ is a monovalent hydrocarbon group,
$R^3$ is a divalent hydrocarbon group, A is a group having a formula (3) or (4):

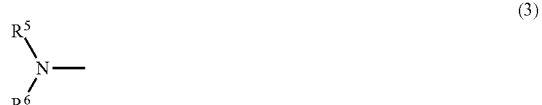

(3)

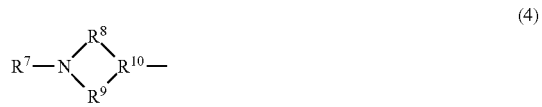

(4)

wherein each of $R^5$ and $R^6$ is a monovalent hydrocarbon group, a triorganosilyl group, or the like, $R^7$ is a monovalent hydrocarbon group or triorganosilyl group, each of $R^8$ and $R^9$ is a divalent carbon atom having 1 to 20 carbon atoms, and $R^{10}$ is C—H or a nitrogen atom, and
E is an oxygen atom, a sulfur atom, or a group having a formula (5):

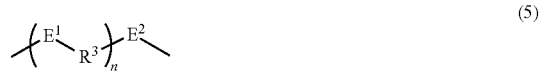

(5)

wherein $R^3$ is the same as described above, each of $E^1$ and $E^2$ independently is an oxygen atom or a sulfur atom, and n is an integer of 1 to 10.

3 Claims, 6 Drawing Sheets

NITROGEN-CONTAINING CYCLIC ORGANOXYSILANE COMPOUND AND METHOD FOR PRODUCING THE SAME

CROSS-REFERENCE TO RELATED APPLICATION

This non-provisional application claims priority under 35 U.S.C. § 119(a) on Patent Application No. 2018-221342 filed in Japan on Nov. 27, 2018, the entire contents of which are hereby incorporated by reference.

TECHNICAL FIELD

The present invention relates to a nitrogen-containing cyclic organoxysilane compound and a method for producing the same, and more specifically, the present invention relates to a nitrogen-containing cyclic organoxysilane compound useful as, for example, a silane coupling agent, a surface treatment agent, a resin additive, a paint additive, an adhesive, and the like, and a method for producing the same.

BACKGROUND ART

A silane compound having an amino group is useful as a silane coupling agent, a surface treatment agent, a resin additive, a paint additive, an adhesive, and the like. As such a silane compound having an amino group, for example, there are known organoxysilane compounds having primary amino groups such as aminopropyltrimethoxysilane and aminopropyltriethoxysilane, organoxysilane compounds having secondary amino groups such as N-phenylaminopropyltrimethoxysilane, and organoxysilane compounds having tertiary amino groups such as dimethylaminopropyltrimethoxysilane and diethylaminopropyltriethoxysilane.

However, since each of these silane compounds has a methoxy group or an ethoxy group as an organoxy group bonded to a silicon atom, when used as a silane coupling agent, a surface treatment agent, a resin additive, a paint additive, an adhesive, or the like, the silane compound generates a low-boiling-point alcohol such as methanol or ethanol, so-called a volatile organic compound, through hydrolysis reaction, which may increase the environmental burden and harm the health of the user.

In recent years, as related to global warming and health issues, reducing the volatile organic compounds has been a major theme, and the development is underway to reduce the volatile organic compounds by reducing the amount of low-boiling-point alcohol generated from organoxysilane compounds.

From such a viewpoint, compounds described in Patent Documents 1 to 3 have been proposed as compounds capable of reducing the volatile organic compounds.

For example, in N,N-dimethylaminopropyltriundecyloxysilane described in Patent Document 1, alcohol produced during use is undecanol and does not have volatility.

Further, an aminosilane compound having an intramolecular organoxysilyl group described in Patent Documents 2 and 3 can reduce the low-boiling-point alcohol generated during use by one molecule per molecule of aminosilane compound by forming an organoxy group in the molecule.

CITATION LIST

Patent Document 1: JP-A 1108-166679
Patent Document 2: JP-A 2010-120925
Patent Document 3: JP-A 2014-1152

SUMMARY OF THE INVENTION

However, as for the compound of Patent Document 1, especially when the number of organoxy groups is three, distillation purification cannot be performed due to a remarkable increase in boiling point and it is difficult to industrially increase the purity.

On the other hand, as for the compound of each of Patent Documents 2 and 3, since the compound is the intramolecular organoxy group, the increase in boiling point is not large and there is no problem with the distillation purification. However, the amount of low-boiling-point alcohol generated during use is one molecule per molecule of the aminosilane compound, and the amount reduced cannot be said to be sufficient.

The present invention has been made in view of the above circumstances, and it is an object of the present invention to provide a silane compound and a method for producing the same, the silane compound being able to be purified by distillation, and generating less low-boiling-point alcohol when used as a silane coupling agent, a surface treatment agent, a resin additive, a paint additive, an adhesive, or the like.

As a result of intensive studies to achieve the above object, the present inventors have found that a specific nitrogen-containing cyclic organoxysilane compound can be purified by distillation, and generates no or less low-boiling-point alcohol when used as a silane coupling agent, a surface treatment agent, a resin additive, a paint additive, an adhesive, and the like, to complete the present invention.

That is, the present invention provides the following.

1. A nitrogen-containing cyclic organoxysilane compound having the following general formula (1):

(1)

wherein $R^1$ is a divalent hydrocarbon group having 1 to 20 carbon atoms that may include a heteroatom, $R^2$ is a substituted or unsubstituted monovalent hydrocarbon group having 1 to 20 carbon atoms or an organoxy group having the following general formula (2):

(2)

wherein $R^4$ is a substituted or unsubstituted monovalent hydrocarbon group having 1 to 20 carbon atoms, each $R^3$ independently is a divalent hydrocarbon group having 1 to 10 carbon atoms, A is a group having the following general formula (3) or general formula (4):

(3)

-continued (4)

wherein each of $R^5$ and $R^6$ independently is a substituted or unsubstituted monovalent hydrocarbon group having 1 to 20 carbon atoms that may include a heteroatom or triorganosilyl group, and $R^5$ and $R^6$ may be bonded to each other to form a ring having 2 to 20 carbon atoms together with a nitrogen atom to which $R^5$ and $R^6$ are bonded, $R^7$ is a substituted or unsubstituted monovalent hydrocarbon group having 1 to 20 carbon atoms that may include a heteroatom or triorganosilyl group, each of $R^8$ and $R^9$ is a divalent hydrocarbon group having 1 to 20 carbon atoms, and $R^{10}$ is C—H or a nitrogen atom, and E is an oxygen atom, a sulfur atom, or a group having the following general formula (5):

(5)

wherein $R^3$ is the same meaning as described above, each of $E^1$ and $E^2$ independently is an oxygen atom or a sulfur atom, and n is an integer of 1 to 10.

2. A method for producing the nitrogen-containing cyclic organoxysilane compound of 1, containing the step of reacting a halogen-containing cyclic organoxysilane compound having the following general formula (6):

(6)

wherein $R^1$ to $R^3$ and E represent the same meanings as described above, and X is a halogen atom, with an amine compound having the following general formula (7):

A-H     (7)

wherein A represents the same meaning as described above.

3. The method for producing the nitrogen-containing cyclic organoxysilane compound of 2, wherein the reaction is performed in the presence of a basic catalyst or an acidic catalyst.

Advantageous Effects of the Invention

The nitrogen-containing cyclic organoxysilane compound of the present invention can be purified by distillation, and generates no or less low-boiling-point alcohol during use, so that the nitrogen-containing cyclic organoxysilane compound is useful as a silane coupling agent, a surface treatment agent, a resin additive, a paint additive, an adhesive, and the like.

DESCRIPTION OF THE PREFERRED EMBODIMENTS

Hereinafter, the present invention is described specifically.

The nitrogen-containing cyclic organoxysilane compound of the present invention is represented by the following general formula (1):

(1)

In the above general formula (1), $R^1$ represents a divalent hydrocarbon group having 1 to 20, preferably 1 to 10, and more preferably 1 to 5 carbon atoms, which may include a heteroatom.

The divalent hydrocarbon group may be linear, branched, or cyclic, and specific examples thereof include: alkylene groups such as methylene, ethylene, methylethylene(propylene), trimethylene, methylpropylene, tetramethylene, hexamethylene, octamethylene, decamethylene, and isobutylene groups; arylene groups such as phenylene and methylphenylene groups: aralkylene groups such as ethylenephenylene and ethylenephenylenemethylene groups; and oxaalkylene groups such as 2-oxapropylene and 2-oxapentylene groups.

Among these, $R^1$ is preferably a methylene group, an ethylene group, or a trimethylene group.

$R^2$ represents a substituted or unsubstituted monovalent hydrocarbon group having 1 to 20 carbon atoms, preferably 1 to 10 carbon atoms, and more preferably 1 to 5 carbon atoms, or an organoxy group having the following general formula (2):

—OR$^4$     (2)

wherein $R^4$ represents a substituted or unsubstituted monovalent hydrocarbon group having 1 to 20, preferably 1 to 10, and more preferably 1 to 5 carbon atoms.

The monovalent hydrocarbon group for $R^2$ and $R^4$ may be linear, branched, or cyclic.

Specific examples thereof include: linear alkyl groups such as methyl, ethyl, n-propyl, n-butyl, n-pentyl, n-hexyl, n-heptyl, n-octyl, decyl, dodecyl, tetradecyl, hexadecyl, octadecyl, and icosyl groups; branched alkyl groups such as isopropyl, isobutyl, sec-butyl, tert-butyl, texyl, and 2-ethylhexyl groups; cyclic alkyl groups such as cyclopentyl and cyclohexyl groups; alkenyl groups such as vinyl, allyl, butenyl, and pentenyl groups; aryl groups such as phenyl and tolyl groups; and aralkyl groups such as benzyl groups.

Among these, from the viewpoint of availability of raw materials and usefulness of the product, each of $R^2$ and $R^4$ is preferably: an alkyl group having 1 to 3 carbon atoms, such as a methyl group, n ethyl group, and a propyl group; and an alkenyl group having 1 to 5 carbon atoms, such as an allyl group, a butenyl group, and a pentenyl group.

In the monovalent hydrocarbon group, part or all of the hydrogen atoms may be substituted with other substituents, and specific examples of this substituent include: alkoxy groups having 1 to 5 carbon atoms, such as methoxy, ethoxy, and (iso)propoxy groups; halogen atoms such as a fluorine atom, a chlorine atom, a bromine atom, and an iodine atom; cyano groups; amino groups; acyl groups having 2 to 10 carbon atoms; trichlorosilyl groups; and a trialkylsilyl group, a dialkylmonochlorosilyl group, a monoalkyldichlorosilyl group, a trialkoxysilyl group, a dialkylmonoalkoxysilyl group, and a monoalkyldialkoxysilyl group, each with an alkyl group or an alkoxy group having 1 to 5 carbon atoms.

Each $R^3$ independently represents a divalent hydrocarbon group having 1 to 10 carbon atoms, preferably 1 to 5 carbon atoms.

The divalent hydrocarbon group may be linear, branched, or cyclic, and specific examples thereof include: alkylene groups such as methylene, ethylene, methylethylene(propylene), trimethylene, methylpropylene, tetramethylene, hexamethylene, octamethylene, decamethylene, and isobutylene groups; arylene groups such as phenylene and methylphenylene groups; and aralkylene groups such as an ethylene phenylene group and an ethylene phenylenemethylene group.

Among these, $R^3$ is preferably a methylene group or an ethylene group.

A represents a group having the following general formula (3) or general formula (4).

(3)

(4)

Each of $R^5$, $R^6$, and $R^7$ independently represents a substituted or unsubstituted monovalent hydrocarbon group having 1 to 20 carbon atoms, preferably 1 to 10 carbon atoms, and more preferably 1 to 5 carbon atoms, which may contain a heteroatom or a triorganosilyl group, and $R^5$ and $R^6$ may be bonded to each other to form a ring having 2 to 20 carbon atoms together with a nitrogen atom to which $R^5$ and $R^6$ are bonded.

The monovalent hydrocarbon group for $R^5$, $R^6$, and $R^7$ may be linear, branched, or cyclic, and specific examples thereof include: linear alkyl groups such as methyl, ethyl, n-propyl, n-butyl, n-pentyl, n-hexyl, n-heptyl, n-octyl, decyl, dodecyl, tetradecyl, hexadecyl, octadecyl, and icosyl groups; branched alkyl groups such as isopropyl, isobutyl, sec-butyl, tert-butyl, texyl, and 2-ethylhexyl groups; cyclic alkyl groups such as cyclopentyl and cyclohexyl groups; alkenyl groups such as vinyl, allyl, butenyl, and pentenyl groups; aryl groups such as phenyl and tolyl groups; and aralkyl groups such as a benzyl group.

Meanwhile, specific examples of the triorganosilyl group include trimethylsilyl, ethyldimethylsilyl, diethylmethylsilyl, triethylsilyl, tri-n-propylsilyl, triisopropylsilyl, tri-n-butylsilyl, triisobutylsilyl, tri-sec-butylsilyl, t-butyldimethylsilyl, tricyclopentylsilyl, tricyclohexylsilyl, triphenylsilyl, and t-butyldiphenylsilyl groups.

Specific examples of the ring having 2 to 20 carbon atoms and formed by $R^5$ and $R^6$, bonded to each other, together with a nitrogen atom include a morpholine ring and a piperidine ring.

Among these, each of $R^5$ and $R^6$ is preferably a methyl group, an ethyl group, an isopropyl group, a sec-butyl group, a tert-butyl group, or a morpholine ring formed by $R^5$ and $R^6$, bonded to each other, together with a nitrogen atom, from the viewpoint of the usefulness of the product.

$R^7$ is preferably a methyl group, an ethyl group, an isopropyl group, a sec-butyl group, or a tert-butyl group from the viewpoint of the usefulness of the product.

Note that part or all of the hydrogen atoms in the monovalent hydrocarbon group may be substituted with other substituents exemplified for $R^2$ and $R^4$ above.

Each of $R^8$ and $R^9$ independently represents a divalent hydrocarbon group having 1 to 20 carbon atoms, preferably 1 to 10 carbon atoms, and more preferably 1 to 5 carbon atoms. $R^{10}$ represents C—H or a nitrogen atom but is preferably a nitrogen atom.

The divalent hydrocarbon group of each of $R^8$ and $R^9$ may be linear, branched, or cyclic, and specific examples thereof include: alkylene groups such as methylene, ethylene, methylethylene(propylene), trimethylene, methylpropylene, tetramethylene, hexamethylene, octamethylene, decamethylene, and isobutylene groups; arylene groups such as phenylene and methylphenylene groups; and aralkylene groups such as ethylenephenylene and ethylenephenylenemethylene groups.

In particular, it is preferable that $R^8$ and $R^9$ be both the ethylene groups and $R^{10}$ be the nitrogen atom, that is, $R^8$, $R^9$, and $R^{10}$ form a piperazine ring.

E represents an oxygen atom, a sulfur atom, or a group having the following general formula (5):

(5)

wherein $R^3$ represents the same meaning as described above but is preferably a methylene group or an ethylene group.

Each of $E^1$ and $E^2$ independently represents an oxygen atom or a sulfur atom, and n represents an integer of 1 to 10, preferably an integer of 1 to 5, and more preferably an integer of 1 to 3.

Specific examples of the nitrogen-containing cyclic organoxysilane compound having the above general formula (1) include
2-dimethylaminomethyl-2-methyl-1,3,6-trioxa-2-silacyclooctane,
2-diethylaminomethyl-2-methyl-1,3,6-trioxa-2-silacyclooctane, 2-dibutylaminomethyl-2-methyl-1,3,6-trioxa-2-silacyclooctane,
2-(N,N-bistrimethylsilyl)aminomethyl-2-methyl-1,3,6-trioxa-2-silacyclooctane,
2-morpholinomethyl-2-methyl-1,3,6-trioxa-2-silacyclooctane,
2-(4-methylpiperazine-1-yl)methyl-2-methyl-1,3,6-trioxa-2-silacyclooctane,
2-(3-dimethylaminopropyl)-2-methyl-1,3,6-trioxa-2-silacyclooctane,
2-(3-diethylaminopropyl)-2-methyl-1,3,6-trioxa-2-silacyclooctane,
2-(3-dibutylaminopropyl)-2-methyl-1,3,6-trioxa-2-silacyclooctane,
2-[3-(N,N-bistrimethylsilyl)aminopropyl]-2-methyl-1,3,6-trioxa-2-silacyclooctane,
2-(3-morpholinopropyl)-2-methyl-1,3,6-trioxa-2-silacyclooctane,
2-[3-(4-methylpiperazine-1-yl)propyl]-2-methyl-1,3,6-trioxa-2-silacyclooctane,
2-dimethylaminomethyl-2-methoxy-1,3,6-trioxa-2-silacyclooctane,
2-diethylaminomethyl-2-methoxy-1,3,6-trioxa-2-silacyclooctane,
2-dibutylaminomethyl-2-methoxy-1,3,6-trioxa-2-silacyclooctane,
2-(N,N-bistrimethylsilyl)aminomethyl-2-methoxy-1,3,6-trioxa-2-silacyclooctane,
2-morpholinomethyl-2-methoxy-1,3,6-trioxa-2-silacyclooctane,
2-(4-methylpiperazine-1-yl)methyl-2-methoxy-1,3,6-trioxa-2-silacyclooctane,
2-(3-dimethylaminopropyl)-2-methoxy-1,3,6-trioxa-2-silacyclooctane,
2-(3-diethylaminopropyl)-2-methoxy-1,3,6-trioxa-2-silacyclooctane,
2-(3-dibutylaminopropyl)-2-methoxy-1,3,6-trioxa-2-silacyclooctane,
2-[3-(N,N-bistrimethylsilyl)aminopropyl]-2-methoxy-1,3,6-trioxa-2-silacyclooctane,
2-(3-morpholinopropyl)-2-methoxy-1,3,6-trioxa-2-silacyclooctane,
2-[3-(4-methylpiperazine-1-yl)propyl]-2-methoxy-1,3,6-trioxa-2-silacyclooctane,
2-dimethylamino methyl-2-ethoxy-1,3,6-trioxa-2-silacyclooctane,
2-diethylaminomethyl-2-ethoxy-1,3,6-trioxa-2-silacyclooctane,
2-dibutylaminomethyl-2-ethoxy-1,3,6-trioxa-2-silacyclooctane,
2-(N,N-bistrimethylsilyl)aminomethyl-2-ethoxy-1,3,6-trioxa-2-silacyclooctane,
2-morpholinomethyl-2-ethoxy-1,3,6-trioxa-2-silacyclooctane,
2-(4-methylpiperazine-1-yl)methyl-2-ethoxy-1,3,6-trioxa-2-silacyclooctane,
2-(3-dimethylaminopropyl)-2-ethoxy-1,3,6-trioxa-2-silacyclooctane,
2-(3-diethylaminopropyl)-2-ethoxy-1,3,6-trioxa-2-silacyclooctane,
2-(3-dibutylaminopropyl)-2-ethoxy-1,3,6-trioxa-2-silacyclooctane,
2-[3-(N,N-bistrimethylsilyl)aminopropyl]-2-ethoxy-1,3,6-trioxa-2-silacyclooctane,
2-(3-morpholinopropyl)-2-ethoxy-1,3,6-trioxa-2-silacyclooctane,
2-[3-(4-methylpiperazine-1-yl)propyr]-2-ethoxy-1,3,6-trioxa-2-silacyclooctane,
2-dimethylaminomethyl-2,4,8-trimethyl-1,3,6-trioxa-2-silacyclooctane,
2-diethylaminomethyl-2,4,8-trimethyl-1,3,6-trioxa-2-silacyclooctane,
2-dibutylaminomethyl-2,4,8-trimethyl-1,3,6-trioxa-2-silacyclooctane,
2-(N,N-bistrimethylsilyl)aminomethyl-2,4,8-trimethyl-1,3,6-trioxa-2-silacyclooctane,
2-morpholinomethyl-2,4,8-trimethyl-1,3,6-trioxa-2-silacyclooctane,
2-(4-methylpiperazine-1-yl)methyl-2,4,8-trimethyl-1,3,6-trioxa-2-silacyclooctane,
2-(3-dimethylaminopropyl)-2,4,8-trimethyl-1,3,6-trioxa-2-silacyclooctane,
2-(3-diethylaminopropyl)-2,4,8-trimethyl-1,3,6-trioxa-2-silacyclooctane,
2-(3-dibutylaminopropyl)-2,4,8-trimethyl-1,3,6-trioxa-2-silacyclooctane,
2-[3-(N,N-bistrimethylsilyl)aminopropyl]-2,4,8-trimethyl-1,3,6-trioxa-2-silacyclooctane,
2-(3-morpholinopropyl)-2,4,8-trimethyl-1,3,6-trioxa-2-silacyclooctane,
2-[3-(4-methylpiperazine-1-yl)propyl]-2,4,8-trimethyl-1,3,6-trioxa-2-silacyclooctane,
2-dimethylaminomethyl-2-methoxy-4,8-dimethyl-1,3,6-trioxa-2-silacyclooctane,
2-diethylaminomethyl-2-methoxy-4,8-dimethyl-1,3,6-trioxa-2-silacyclooctane,
2-dibutylaminomethyl-2-methoxy-4,8-dimethyl-1,3,6-trioxa-2-silacyclooctane,
2-(N,N-bistrimethylsilyl)aminomethyl-2-methoxy-4,8-dimethyl-1,3,6-trioxa-2-silacyclooctane,
2-morpholinomethyl-2-methoxy-4,8-dimethyl-1,3,6-trioxa-2-silacyclooctane,
2-(4-methylpiperazine-1-yl)methyl-2-methoxy-4,8-dimethyl-1,3,6-trioxa-2-silacyclooctane,
2-(3-dimethylaminopropyl)-2-methoxy-4,8-dimethyl-1,3,6-trioxa-2-silacyclooctane,
2-(3-diethylaminopropyl)-2-methoxy-4,8-dimethyl-1,3,6-trioxa-2-silacyclooctane,
2-(3-dibutylaminopropyl)-2-methoxy-4,8-dimethyl-1,3,6-trioxa-2-silacyclooctane,
2-[3-(N,N-bistrimethylsilyl)aminopropyl]-2-methoxy-4,8-dimethyl-1,3,6-trioxa-2-silacyclooctane,
2-(3-morpholinopropyl)-2-methoxy-4,8-dimethyl-1,3,6-trioxa-2-silacyclooctane,
2-[3-(4-methylpiperazine-1-yl)propyl]-2-methoxy-4,8-dimethyl-1,3,6-trioxa-2-silacyclooctane,
2-dimethylaminomethyl-2-ethoxy-4,8-dimethyl-1,3,6-trioxa-2-silacyclooctane,
2-diethylaminomethyl-2-ethoxy-4,8-dimethyl-1,3,6-trioxa-2-silacyclooctane,
2-dibutylaminomethyl-2-ethoxy-4,8-dimethyl-1,3,6-trioxa-2-silacyclooctane,
2-(N,N-bistrimethylsilyl)aminomethyl-2-ethoxy-4,8-dimethyl-1,3,6-trioxa-2-silacyclooctane,
2-morpholinomethyl-2-ethoxy-4,8-dimethyl-1,3,6-trioxa-2-silacyclooctane,
2-(4-methylpiperazine-1-yl)methyl-2-ethoxy-4,8-dimethyl-1,3,6-trioxa-2-silacyclooctane,
2-(3-dimethylaminopropyl)-2-ethoxy-4,8-dimethyl-1,3,6-trioxa-2-silacyclooctane, 2-(3-diethylaminopropyl)-2-ethoxy-4,8-dimethyl-1,3,6-trioxa-2-silacyclooctane,
2-(3-dibutylaminopropyl)-2-ethoxy-4,8-dimethyl-1,3,6-trioxa-2-silacyclooctane,
2-[3-(N,N-bistrimethylsilyl)aminopropyl]-2-ethoxy-4,8-dimethyl-1,3,6-trioxa-2-silacyclooctane,
2-(3-morpholinopropyl)-2-ethoxy-4,8-dimethyl-1,3,6-trioxa-2-silacyclooctane,
2-[3-(4-methylpiperazine-1-yl)propyl]-2-ethoxy-4,8-dimethyl-1,3,6-trioxa-2-silacyclooctane,
2-dimethylaminomethyl-2-methyl-1,0,3-dioxa-6-thia-2-silacyclooctane,
2-diethylaminomethyl-2-methyl-1,3-dioxa-6-thia-2-silacyclooctane,
2-dibutylaminomethyl-2-methyl-1,3-dioxa-6-thia-2-silacyclooctane,
2-(N,N-bistrimethylsilyl)aminomethyl-2-methyl-1,3-dioxa-6-thia-2-silacyclooctane,
2-morpholinomethyl-2-methyl-1,3-dioxa-6-thia-2-silacyclooctane,
2-(4-methylpiperazine-1-yl)methyl-2-methyl-1,3-dioxa-6-thia-2-silacyclooctane,
2-(3-dimethylaminopropyl)-2-methyl-1,3-dioxa-6-thia-2-silacyclooctane,
2-(3-diethylaminopropyl)-2-methyl-1,3-dioxa-6-thia-2-silacyclooctane,
2-(3-dibutylaminopropyl)-2-methyl-1,3-dioxa-6-thia-2-silacyclooctane,
2-[3-(N,N-bistrimethylsilyl)aminopropyl]-2-methyl-1,3-dioxa-6-thia-2-silacyclooctane,
2-(3-morpholinopropyl)-2-methyl-1,3-dioxa-6-thia-2-silacyclooctane,
2-[3-(4-methylpiperazine-1-yl)propyl]-2-methyl-1,3-dioxa-6-thia-2-silacyclooctane,
2-dimethylaminomethyl-2-methoxy-1,3-dioxa-6-thia-2-silacyclooctane,
2-diethylaminomethyl-2-methoxy-1,3-dioxa-6-thia-2-silacyclooctane,
2-dibutylaminomethyl-2-methoxy-1,3-dioxa-6-thia-2-silacyclooctane,
2-(N,N-bistrimethylsilyl)aminomethyl-2-methoxy-1,3-dioxa-6-thia-2-silacyclooctane,
2-morpholinomethyl-2-methoxy-1,3-dioxa-6-thia-2-silacyclooctane,
2-(4-methylpiperazine-1-yl)methyl-2-methoxy-1,3-dioxa-6-thia-2-silacyclooctane,
2-(3-dimethylaminopropyl)-2-methoxy-1,3-dioxa-6-thia-2-silacyclooctane,
2-(3-diethylaminopropyl)-2-methoxy-1,3-dioxa-6-thia-2-silacyclooctane,
2-(3-dibutylaminopropyl)-2-methoxy-1,3-dioxa-6-thia-2-silacyclooctane,
2-[3-(N,N-bistrimethylsilyl)aminopropyl]-2-methoxy-1,3-dioxa-6-thia-2-silacyclooctane,
2-(3-morpholinopropyl)-2-methoxy-1,3-dioxa-6-thia-2-silacyclooctane,
2-[3-(4-methylpiperazine-1-yl)propyl]-2-methoxy-1,3-dioxa-6-thia-2-silacyclooctane,
2-dimethylaminomethyl-2-ethoxy-1,3-dioxa-6-thia-2-silacyclooctane,
2-diethylamino methyl-2-ethoxy-1,3-dioxa-6-thia-2-silacyclooctane,
2-dibutylaminomethyl-2-ethoxy-1,3-dioxa-6-thia-2-silacyclooctane,
2-(N,N-bistrimethylsilyl)aminomethyl-2-ethoxy-1,3-dioxa-6-thia-2-silacyclooctane,
2-morpholinomethyl-2-ethoxy-1,3-dioxa-6-thia-2-silacyclooctane,
2-(4-methylpiperazine-1-yl)methyl-2-ethoxy-1,3-dioxa-6-thia-2-silacyclooctane,
2-(3-dimethylaminopropyl)-2-ethoxy-1,3-dioxa-6-thia-2-silacyclooctane,
2-(3-diethylaminopropyl)-2-ethoxy-1,3-dioxa-6-thia-2-silacyclooctane,
2-(3-dibutylaminopropyl)-2-ethoxy-1,3-dioxa-6-thia-2-silacyclooctane,
2-[3-(N,N-bistrimethylsilyl)aminopropyl]-2-ethoxy-1,3-dioxa-6-thia-2-silacyclooctane,
2-(3-morpholinopropyl)-2-ethoxy-1,3-dioxa-6-thia-2-silacyclooctane, and
2-[3-(4-methylpiperazine-1-yl)propyl]-2-ethoxy-1,3-dioxa-6-thia-2-silacyclooctane.

The nitrogen-containing cyclic organoxysilane compound having the above general formula (1) of the present invention can be produced by, for example, reacting a halogen-containing cyclic organoxysilane compound having the following general formula (6) with an amine compound having a general formula (7) A-H (A represents the same meaning as described above).

(6)

wherein $R^1$ to $R^3$ and E represent the same meanings as described above, and X represents a halogen atom.

Specific examples of the halogen-containing cyclic organoxysilane compound having the above general formula (6) include
2-chloromethyl-2-methyl-1,3,6-trioxa-2-silacyclooctane,
2-bromomethyl-2-methyl-1,3,6-trioxa-2-silacyclooctane,
2-iodomethyl-2-methyl-1,3,6-trioxa-2-silacyclooctane,
2-(3-chloropropyl)-2-methyl-1,3,6-trioxa-2-silacyclooctane,
2-(3-bromopropyl)-2-methyl-1,3,6-trioxa-2-silacyclooctane,
2-(3-iodopropyl)-2-methyl-1,3,6-trioxa-2-silacyclooctane,
2-chloromethyl-2-methoxy-1,3,6-trioxa-2-silacyclooctane,
2-bromomethyl-2-methoxy-1,3,6-trioxa-2-silacyclooctane,
2-iodomethyl-2-methoxy-1,3,6-trioxa-2-silacyclooctane,
2-(3-chloropropyl)-2-methoxy-1,3,6-trioxa-2-silacyclooctane,
2-(3-bromopropyl)-2-methoxy-1,3,6-trioxa-2-silacyclooctane,
2-(3-iodopropyl)-2-methoxy-1,3,6-trioxa-2-silacyclooctane,
2-chloromethyl-2-ethoxy-1,3,6-trioxa-2-silacyclooctane,
2-bromomethyl-2-ethoxy-1,3,6-trioxa-2-silacyclooctane,
2-iodomethyl-2-ethoxy-1,3,6-trioxa-2-silacyclooctane,
2-(3-chloropropyl)-2-ethoxy-1,3,6-trioxa-2-silacyclooctane,
2-(3-bromopropyl)-2-ethoxy-1,3,6-trioxa-2-silacyclooctane,
2-(3-iodopropyl)-2-ethoxy-1,3,6-trioxa-2-silacyclooctane,
2-chloromethyl-2,4,8-trimethyl-1,3,6-trioxa-2-silacyclooctane,
2-bromomethyl-2,4,8-trimethyl-1,3,6-trioxa-2-silacyclooctane,
2-iodomethyl-2,4,8-trimethyl-1,3,6-trioxa-2-silacyclooctane, 2-(3-chloropropyl)-2,4,8-trimethyl-1,3,6-trioxa-2-silacyclooctane,
2-(3-bromopropyl)-2,4,8-trimethyl-1,3,6-trioxa-2-silacyclooctane,
2-(3-iodopropyl)-2,4,8-trimethyl-1,3,6-trioxa-2-silacyclooctane,
2-chloromethyl-2-methoxy-4,8-dimethyl-1,3,6-trioxa-2-silacyclooctane,
2-bromomethyl-2-methoxy-4,8-dimethyl-1,3,6-trioxa-2-silacyclooctane,
2-iodomethyl-2-methoxy-4,8-dimethyl-1,3,6-trioxa-2-silacyclooctane,
2-(3-chloropropyl)-2-methoxy-4,8-dimethyl-1,3,6-trioxa-2-silacyclooctane,
2-(3-bromopropyl)-2-methoxy-4,8-dimethyl-1,3,6-trioxa-2-silacyclooctane,
2-(3-iodopropyl)-2-methoxy-4,8-dimethyl-1,3,6-trioxa-2-silacyclooctane,
2-chloromethyl-2-ethoxy-4,8-dimethyl-1,3,6-trioxa-2-silacyclooctane,
2-bromomethyl-2-ethoxy-4,8-dimethyl-1,3,6-trioxa-2-silacyclooctane,
2-iodomethyl-2-ethoxy-4,8-dimethyl-1,3,6-trioxa-2-silacyclooctane,
2-(3-chloropropyl)-2-ethoxy-4,8-dimethyl-1,3,6-trioxa-2-silacyclooctane,
2-(3-bromopropyl)-2-ethoxy-4,8-dimethyl-1,3,6-trioxa-2-silacyclooctane,
2-(3-iodopropyl)-2-ethoxy-4,8-dimethyl-1,3,6-trioxa-2-silacyclooctane,
2-chloromethyl-2-methyl-1,3-dioxa-6-thia-2-silacyclooctane,
2-bromomethyl-2-methyl-1,3-dioxa-6-thia-2-silacyclooctane,
2-iodomethyl-2-methyl-1,3-dioxa-6-thia-2-silacyclooctane,
2-(3-chloropropyl)-2-methyl-1,3-dioxa-6-thia-2-silacyclooctane,
2-(3-bromopropyl)-2-methyl-1,3-dioxa-6-thia-2-silacyclooctane,
2-(3-iodopropyl)-2-methyl-1,3-dioxa-6-thia-2-silacyclooctane,
2-chloromethyl-2-methoxy-1,3-dioxa-6-thia-2-silacyclooctane,
2-bromomethyl-2-methoxy-1,3-dioxa-6-thia-2-silacyclooctane,
2-iodomethyl-2-methoxy-1,3-dioxa-6-thia-2-silacyclooctane,
2-(3-chloropropyl)-2-methoxy-1,3-dioxa-6-thia-2-silacyclooctane,
2-(3-bromopropyl)-2-methoxy-1,3-dioxa-6-thia-2-silacyclooctane,
2-(3-iodopropyl)-2-methoxy-1,3-dioxa-6-thia-2-silacyclooctane,
2-chloromethyl-2-ethoxy-1,3-dioxa-6-thia-2-silacyclooctane,
2-bromomethyl-2-ethoxy-1,3-dioxa-6-thia-2-silacyclooctane,
2-iodomethyl-2-ethoxy-1,3-dioxa-6-thia-2-silacyclooctane,
2-(3-chloropropyl)-2-ethoxy-1,3-dioxa-6-thia-2-silacyclooctane,
2-(3-bromopropyl)-2-ethoxy-1,3-dioxa-6-thia-2-silacyclooctane, and
2-(3-iodopropyl)-2-ethoxy-1,3-dioxa-6-thia-2-silacyclooctane.

Specific examples of the amine compound having the above general formula (7) include dimethylamine, diethylamine, dibutylamine, N,N-bis(trimethylsilyl)allylamine, morpholine, and N-methylpiperazine.

The reaction ratio of the halogen-containing cyclic organoxysilane compound having the above general formula (6) and the amine compound having the above general formula (7) is not particularly limited, but from the viewpoint of reactivity and productivity, the compound having the general formula (7) per mole of the compound having the above general formula (6) is preferably 0.2 to 5.0 mol and more preferably 0.5 to 2.5 mol.

Although the above reaction proceeds even without a catalyst, a catalyst can be used for the purpose of improving the reaction rate and cracking of a high polymer compound produced as a byproduct.

Specific examples of the catalyst include: basic catalysts such as sodium hydroxide, potassium hydroxide, methanol solutions of sodium methoxide, sodium ethoxide, and sodium methoxide, and an ethanol solution of sodium ethoxide; sulfuric acid, sulfonic acid compounds such as methanesulfonic acid, benzenesulfone acid, toluenesulfonic acid, dodecylbenzenesulfonic acid, and trifluoromethanesulfonic acid, acidic catalysts such as hydrochloric acid and nitric acid, and salts thereof.

The amount of the catalyst used is not particularly limited but is preferably 0.0001 to 0.2 mol, and more preferably 0.001 to 0.1 mol, per mole of the compound having the above general formula (6) from the viewpoint of reactivity and productivity.

Although the above reaction proceeds even without a solvent, a solvent can also be used.

Specific examples of the solvent include: hydrocarbon solvents such as pentane, hexane, cyclohexane, heptane, isooctane, benzene, toluene, and xylene; ether solvents such as diethyl ether, tetrahydrofuran, and dioxane; ester solvents such as ethyl acetate and butyl acetate; aprotic polar solvents such as acetonitrile, N,N-dimethylformamide, and N-methylpyrrolidone; chlorinated hydrocarbon solvents such as dichloromethane and chloroform; and alcohol system solvents such as methanol, ethanol, 1-propanol, and 2-propanol, and these may be used alone or in combination of two or more.

After completion of the reaction, hydrochloride of the amine compound is formed, but this salt can be removed by a method such as filtration or separation by adding ethylenediamine, 1,8-diazabicyclo[5.4.0]undecene-7, or the like.

From the reaction solution from which the salt has been removed as described above, a target product can be recovered by an ordinary method such as distillation. During the distillation, the above catalyst can also be used for the purpose of cracking.

EXAMPLES

Hereinafter, the present invention is described more specifically by referring to Examples, but the present invention is not limited to the following Examples.

Note that the $^1$H-NMR spectrum was measured at 600 MHz with a deuterated chloroform solvent, and the IR spectrum was measured by D-ATR (attenuated total reflection).

Example 1

A flask equipped with a stirrer, a reflux condenser, a dropping funnel, and a thermometer was charged with 112.4 g (0.5 mol) of 2-(3-chloropropyl)-2-methyl-1,3,6-trioxa-2-silacyclooctane and 100 ml of N,N-dimethylformamide, which was then heated to 130° C. After the internal temperature was stabilized, 76.5 g (1.05 mol) of diethylamine was added dropwise over 9 hours and stirred at that temperature for 10 hours. The produced salt was removed by filtration and then distilled to obtain 78.6 g of a fraction having a boiling point of 123 to 124° C./0.4 kPa.

Figure 1:
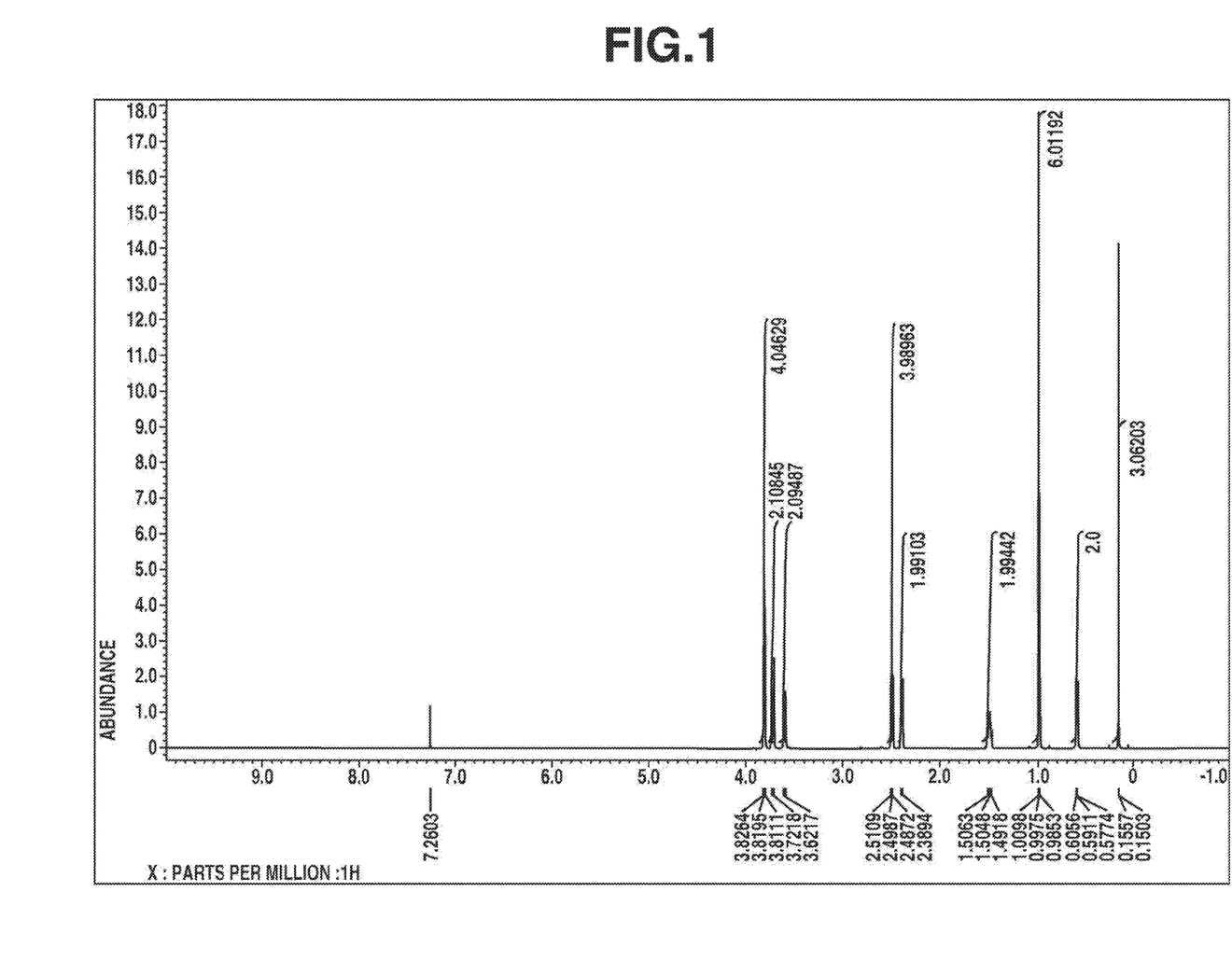
FIG. 1 is a $^1$H-NMR spectrum of 2-(3-diethylaminopropyl)-2-methyl-1,3,6-trioxa-2-silacyclooctane obtained in Example 1.
Figure 2:
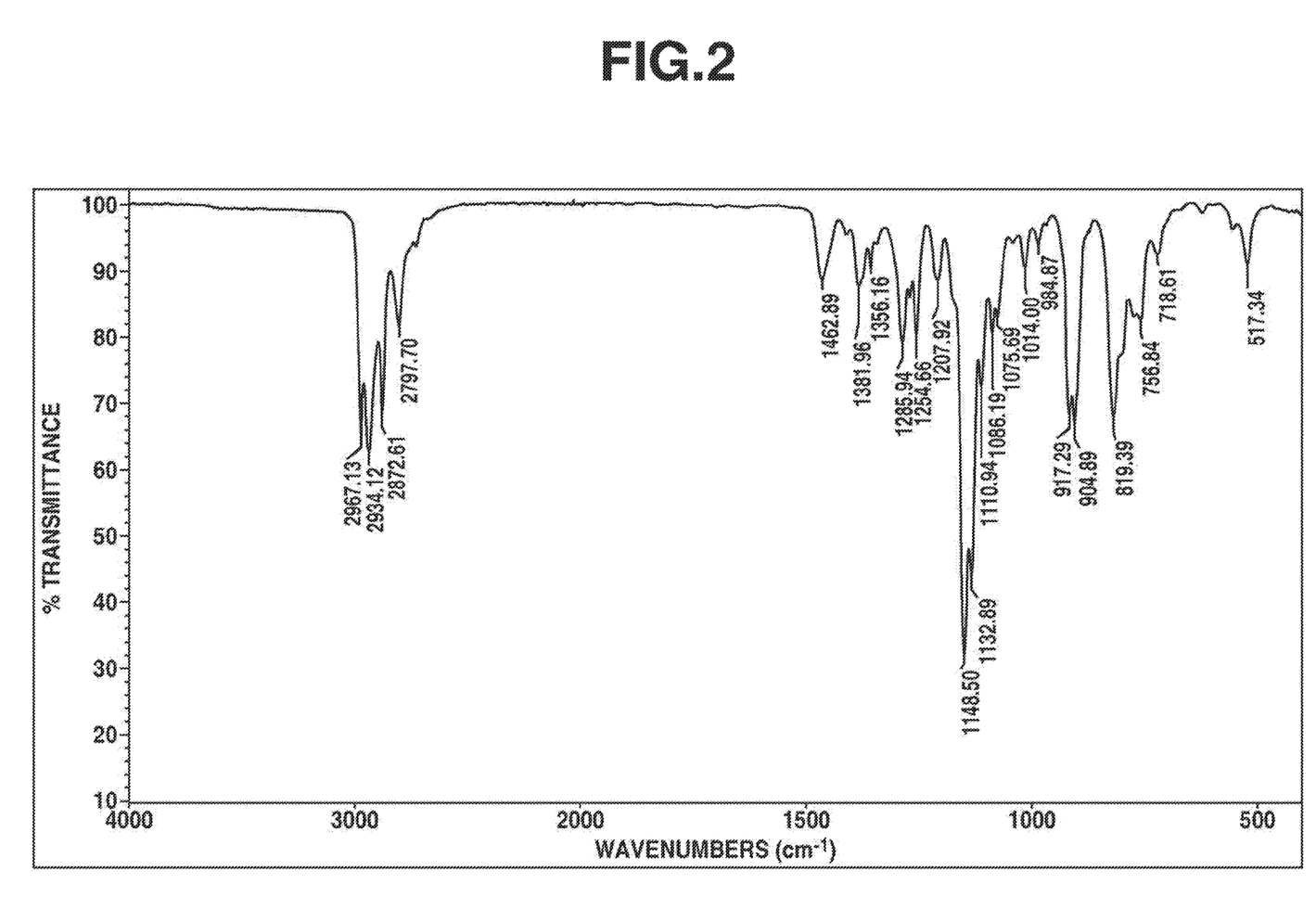
FIG. 2 is an IR spectrum of 2-(3-diethylaminopropyl)-2-methyl-1,3,6-trioxa-2-silacyclooctane obtained in Example 1.

The obtained fraction was measured for a mass spectrum, $^1$H-NMR spectrum, and IR spectrum, and the resulting compound was confirmed to be 2-(3-diethylaminopropyl)-2-methyl-1,3,6-trioxa-2-silacyclooctane. The $^1$H-NMR spectrum is shown in FIG. 1, and the IR spectrum is shown in FIG. 2.

Mass Spectrum
m/z 261, 246, 147, 103, 86, 58

Example 2

A flask equipped with a stirrer, a reflux condenser, a dropping funnel, and a thermometer was charged with 112.4 g (0.5 mol) of 2-(3-chloropropyl)-2-methyl-1,3,6-trioxa-2-silacyclooctane, which was then heated to 130° C. After the internal temperature was stabilized, 100.2 g (1.15 mol) of morpholine was added dropwise over 1 hour and stirred at that temperature for 6 hours. The produced salt was removed by filtration, and 8.4 g of a 28% sodium methoxide methanol solution was added and distilled to obtain 89.3 g of a fraction having a boiling point of 152° C./0.4 kPa.

Figure 3:
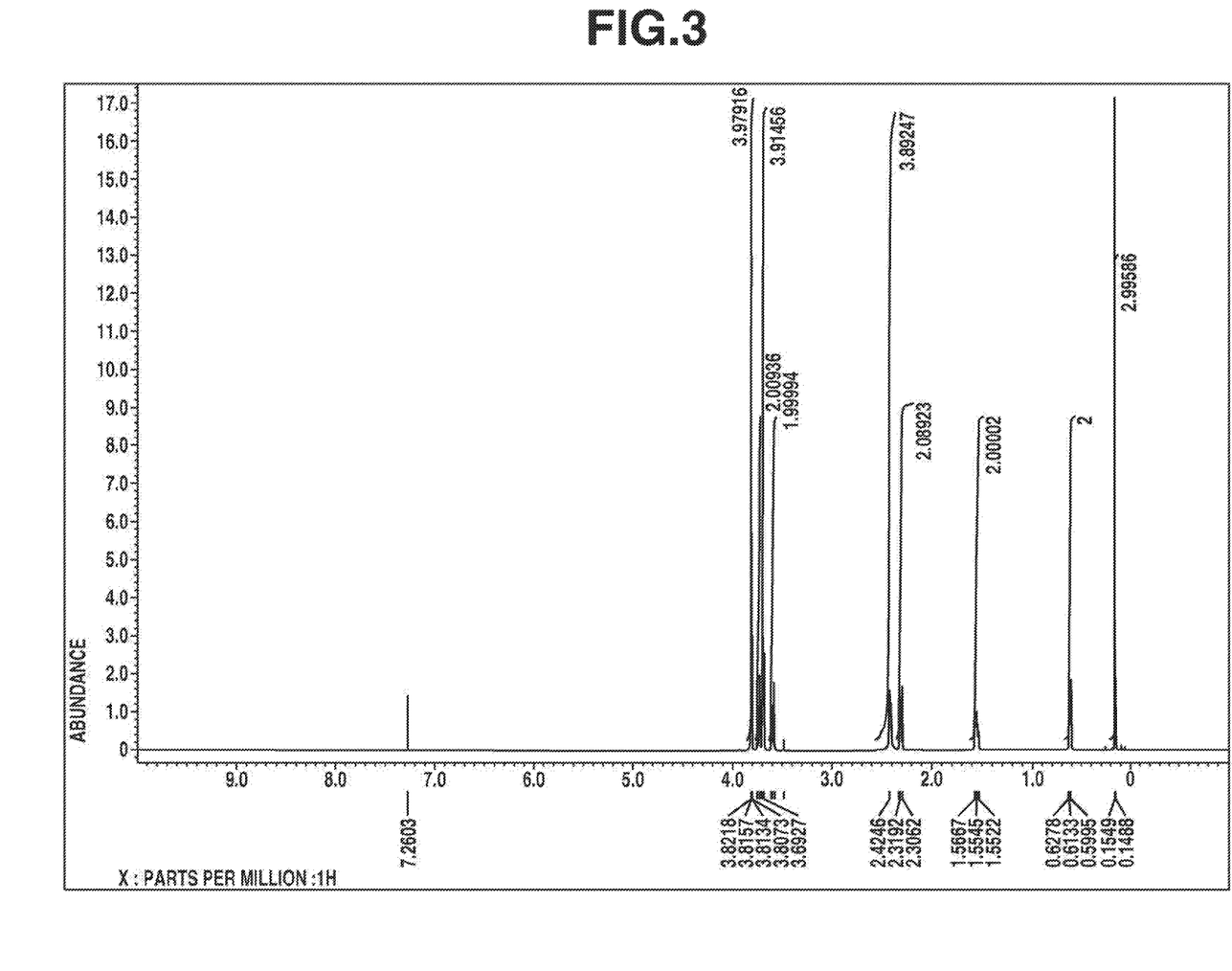
FIG. 3 is a $^1$H-NMR spectrum of 2-(3-morpholinopropyl)-2-methyl-1,3,6-trioxa-2-silacyclooctane obtained in Example 2.
Figure 4:
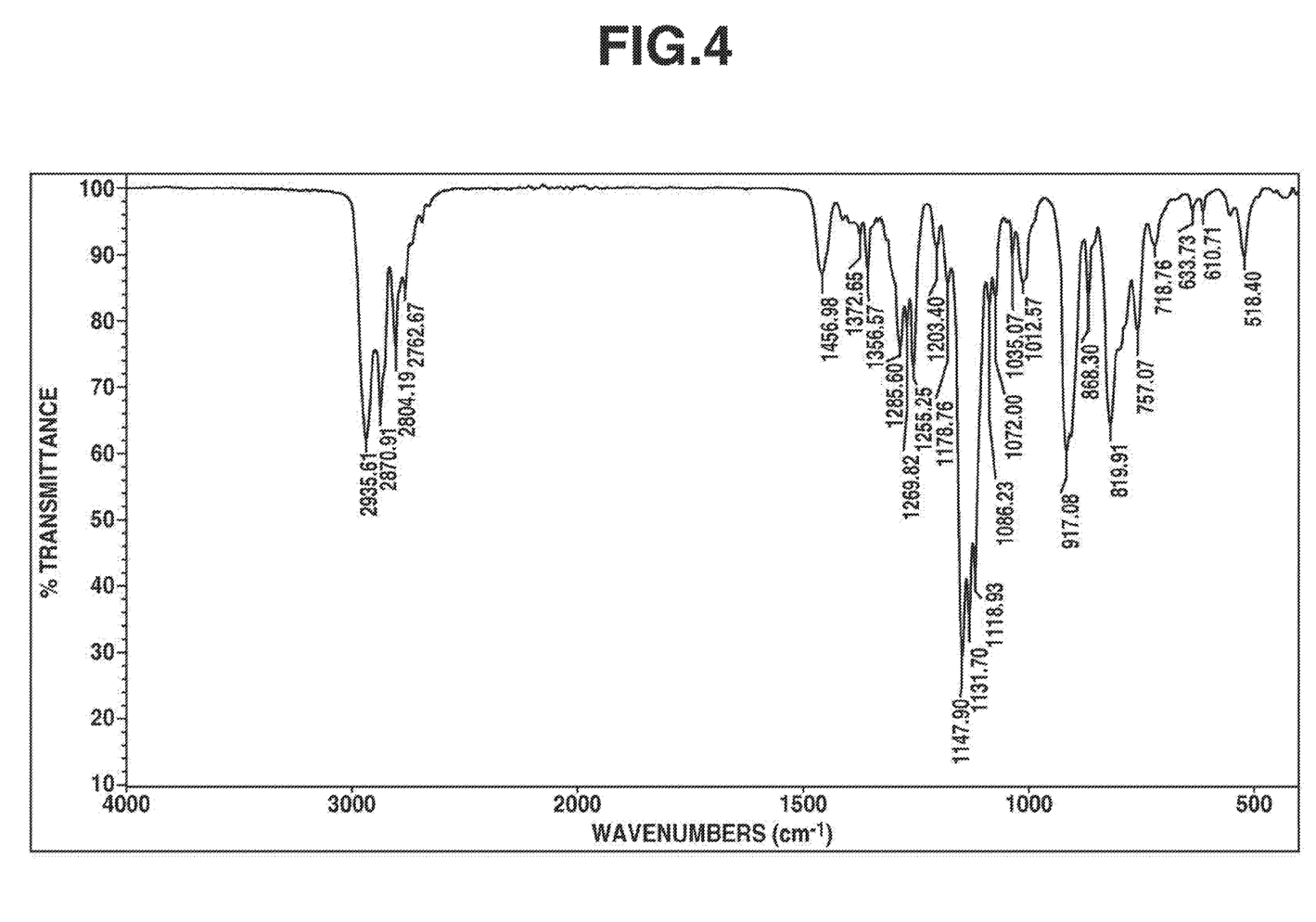
FIG. 4 is an IR spectrum of 2-(3-morpholinopropyl)-2-methyl-1,3,6-trioxa-2-silacyclooctane obtained in Example 2.

The obtained fraction was measured for a mass spectrum, $^1$H-NMR spectrum, and IR spectrum, and the resulting compound was confirmed to be 2-(3-morpholinopropyl)-2-methyl-1,3,6-trioxa-2-silacyclooctane. The $^1$H-NMR spectrum is shown in FIG. 3, and the IR spectrum is shown in FIG. 4.

Mass Spectrum
m/z 275, 260, 245, 147, 100, 61

Example 3

A flask equipped with a stirrer, a reflux condenser, a dropping funnel, and a thermometer was charged with 112.4 g (0.5 mol) of 2-(3-chloropropyl)-2-methyl-1,3,6-trioxa-2-silacyclooctane, which was then heated to 130° C. After the internal temperature was stabilized, 115.2 g (1.15 mol) of N-methylpiperazine was added dropwise over 1 hour, and the mixture was stirred at that temperature for 2 hours. The produced salt was removed by filtration, and 7.8 g of 28% sodium methoxide in methanol was added and distilled to obtain 99.4 g of a fraction having a boiling point of 158° C./0.4 kPa.

Figure 5:
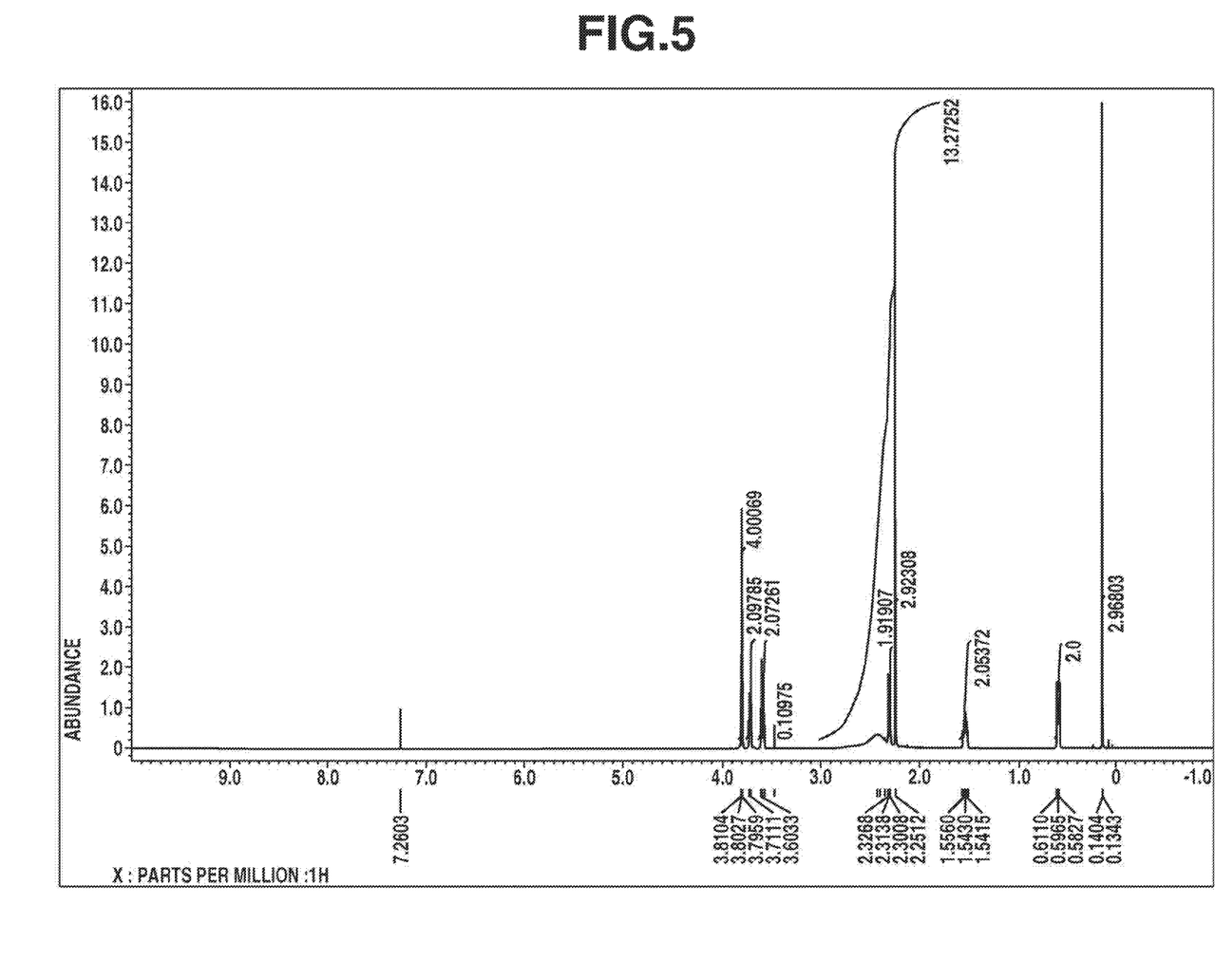
FIG. 5 is a $^1$H-NMR spectrum of 2-[3-(4-methylpiperazine-1-yl)propyl]-2-methyl-1,3,6-trioxa-2-silacyclooctane obtained in Example 3.
Figure 6:
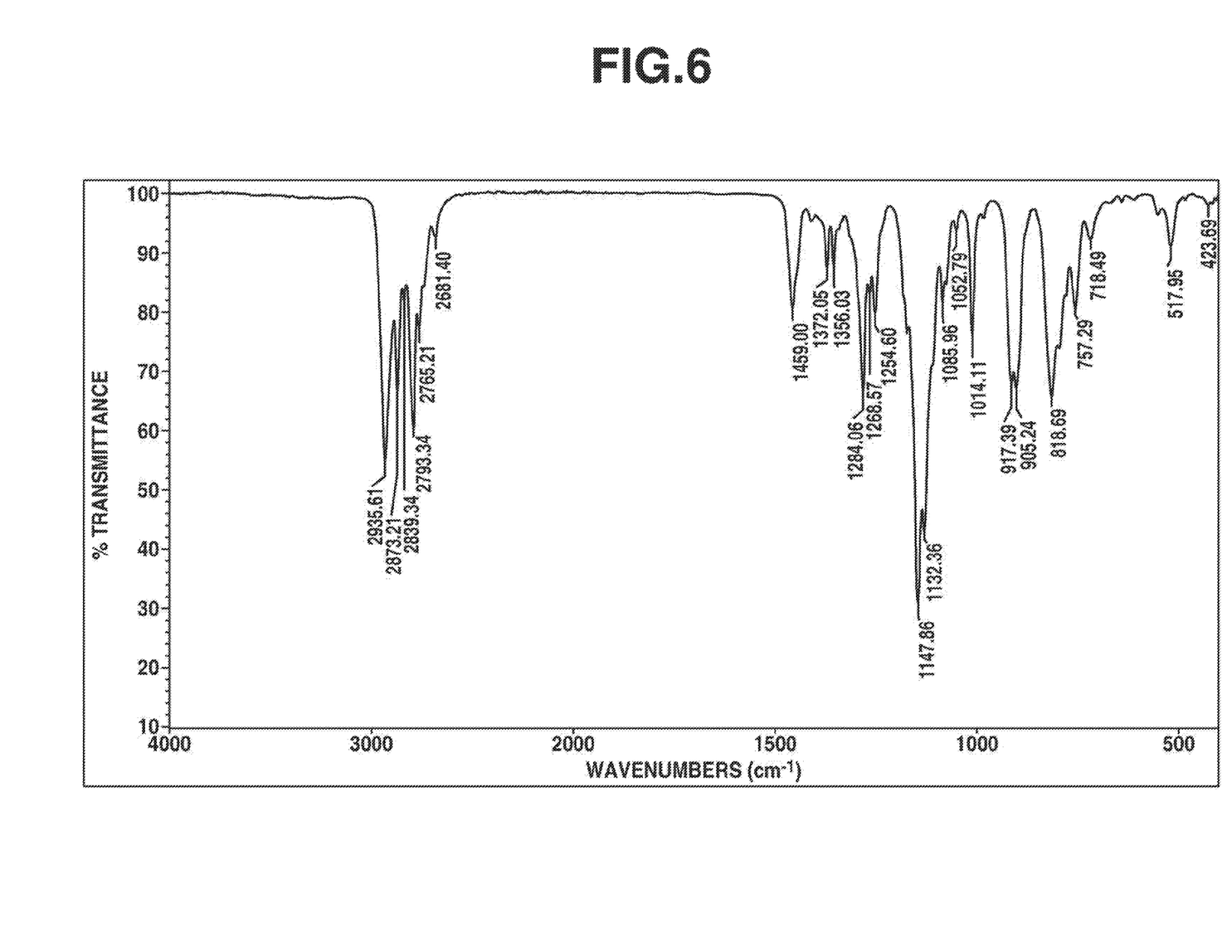
FIG. 6 is an IR spectrum of 2-[3-(4-methylpiperazine-1-yl)propyl]-2-methyl-1,3,6-trioxa-2-silacyclooctane obtained in Example 3.

The obtained fraction was measured for a mass spectrum. $^1$H-NMR spectrum, and IR spectrum, and the resulting compound was confirmed to be 2-[3-(4-methylpiperazine-1-yl)propyl]-2-methyl-1,3,6-trioxa-2-silacyclooctane. The $^1$H-NMR spectrum is shown in FIG. 5, and the IR spectrum is shown in FIG. 6.

Mass Spectrum
m/z 288, 273, 147, 113, 103, 70

Japanese Patent Application No. 2018-221342 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A nitrogen-containing cyclic organoxysilane compound having the following general formula (1):

(1)

wherein $R^1$ is a divalent hydrocarbon group having 1 to 20 carbon atoms that may include a heteroatom,
$R^2$ is a substituted or unsubstituted monovalent hydrocarbon group having 1 to 20 carbon atoms or an organoxy group having the following general formula (2):
—$OR^4$ (2)
wherein $R^4$ is a substituted or unsubstituted monovalent hydrocarbon group having 1 to 20 carbon atoms,
each $R^3$ independently is a divalent hydrocarbon group having 1 to 5 carbon atoms,
A is a group having the following general formula (3) or general formula (4):

(3)

(4)

wherein each of $R^5$ and $R^6$ independently is a substituted or unsubstituted monovalent hydrocarbon group having 1 to 20 carbon atoms that may include a heteroatom or triorganosilyl group, and $R^5$ and $R^6$ may be bonded to each other to form a ring having 2 to 20 carbon atoms together with a nitrogen atom to which $R^5$ and $R^6$ are bonded,
$R^7$ is a substituted or unsubstituted monovalent hydrocarbon group having 1 to 20 carbon atoms that may include a heteroatom or triorganosilyl group,
each of $R^8$ and $R^9$ is a divalent hydrocarbon group having 1 to 5 carbon atoms, and
$R^{10}$ is a nitrogen atom, and
E is an oxygen atom, or a sulfur atom.

2. A method for producing the nitrogen-containing cyclic organoxysilane compound of claim 1, comprising the step of reacting
a halogen-containing cyclic organoxysilane compound having the following general formula (6):

(6)

wherein X is a halogen atom,
$R^1$ is a divalent hydrocarbon group having 1 to 20 carbon atoms that may include a heteroatom,

$R^2$ is a substituted or unsubstituted monovalent hydrocarbon group having 1 to 20 carbon atoms or an organoxy group having the following general formula (2):

—OR⁴     (2)

wherein $R^4$ is a substituted or unsubstituted monovalent hydrocarbon group having 1 to 20 carbon atoms,
each $R^3$ independently is a divalent hydrocarbon group having 1 to 5 carbon atoms, and
E is an oxygen atom, or a sulfur atom;
with an amine compound having the following general formula (7):

A-H     (7)

wherein A is a group having the following general formula (3) or general formula (4):

(3)

(4)

wherein each of $R^5$ and $R^6$ independently is a substituted or unsubstituted monovalent hydrocarbon group having 1 to 20 carbon atoms that may include a heteroatom or triorganosilyl group, and $R^5$ and $R^6$ may be bonded to each other to form a ring having 2 to 20 carbon atoms together with a nitrogen atom to which $R^5$ and $R^6$ are bonded,
$R^7$ is a substituted or unsubstituted monovalent hydrocarbon group having 1 to 20 carbon atoms that may include a heteroatom or triorganosilyl group,
each of $R^8$ and $R^9$ is a divalent hydrocarbon group having 1 to 5 carbon atoms, and
$R^{10}$ is a nitrogen atom.

3. The method for producing the nitrogen-containing cyclic organoxysilane compound of claim 2, wherein the reaction is performed in presence of a basic catalyst or an acidic catalyst.

\* \* \* \* \*